(12) United States Patent
Seppänen et al.

(10) Patent No.: US 8,784,088 B2
(45) Date of Patent: Jul. 22, 2014

(54) AUGER FEEDER FOR CONCRETE MIX, AND SLIPFORM-CASTING APPARATUS

(75) Inventors: Aimo Seppänen, Sääksmäki (FI); Tapio Kukka, Lempäälä (FI); Heikki Lehtonen, Toijala (FI); Lassi Järvinen, Valkeakoski (FI); Jani Eilola, Lempäälä (FI)

(73) Assignee: Elematic Oy AB, Toijala (FI)

( * ) Notice: Subject to any disclaimer, the term of this patent is extended or adjusted under 35 U.S.C. 154(b) by 572 days.

(21) Appl. No.: 12/756,760

(22) Filed: Apr. 8, 2010

(65) Prior Publication Data
US 2010/0260878 A1 Oct. 14, 2010

(30) Foreign Application Priority Data
Apr. 9, 2009 (FI) ...................................... 20095394

(51) Int. Cl.
*B28B 21/08* (2006.01)
(52) U.S. Cl.
USPC ........... 425/62; 425/192 R; 425/207; 425/461
(58) Field of Classification Search
USPC ............. 425/62, 63, 64, 65, 192 R, 207, 262, 425/380, 426, 427, 461, 467
See application file for complete search history.

(56) References Cited

U.S. PATENT DOCUMENTS

| | | | |
|---|---|---|---|
| 4,022,556 A | 5/1977 | Goetjen | |
| 4,838,700 A * | 6/1989 | Williamson | .................... 366/89 |

FOREIGN PATENT DOCUMENTS

GB 2 221 646 A 2/1990

OTHER PUBLICATIONS

Finnish Search Report of Application No. 20095394 dated Feb. 8, 2010 (with English language translation of category of cited documents).
Finnish Office Action of Application No. 20095394 dated Feb. 9, 2010.

\* cited by examiner

*Primary Examiner* — Dimple Bodawala
*Assistant Examiner* — Joseph Leyson
(74) *Attorney, Agent, or Firm* — Dickinson Wright PLLC

(57) ABSTRACT

An auger feeder for concrete mix, comprising a helical segment (1), whereby the auger feeder comprises an insert (2) mounted on an upstream end of the auger feeder, said insert being manufactured in a material softer than that used for manufacturing the auger feeder's helical segment (1), and said insert comprising means (4) for fastening the auger feeder to a casting apparatus. The invention also comprises a method for manufacturing such an auger feeder, and a slipform-casting apparatus equipped with such an auger feeder.

18 Claims, 2 Drawing Sheets

AUGER FEEDER FOR CONCRETE MIX, AND SLIPFORM-CASTING APPARATUS

BACKGROUND

1. Field

Disclosed herein is a concrete mass auger feeder for use in the slipform casting of concrete elements. More specifically, disclosed herein is a solution used in the attachment of an auger feeder, as well as to a method of manufacturing such an auger feeder.

2. Description of Related Art

The process of casting concrete products by extruder type slipform casting involves feeding concrete mass from the concrete mass hopper of a slipform-casting machine on top of auger feeders, said auger feeders conveying concrete mass under pressure into a delimited cross-section established by a casting bed, sidewalls advancing along with the casting machine, together with a vibrator beam defining the top surface of a product being cast, i.e. into a slipform-casting mold. The slipform-casting mold defines a product to be cast in terms of its cross-sectional shape. The concrete mix under pressure, fed into a slipform-casting mold, is compacted for example by a vibrating and/or reciprocating motion of the sidewalls and the vibrator beam, as well as by a reciprocating motion of the auger feeder in addition to a rotary motion of the auger feeder responsible for feeding the mass. In the process of casting concrete products with hollow cores by slipform casting, behind the auger feeders are added hollow-core forming members or hollow-core mandrels. As slipform casting progresses, the slipform-casting machine advances along a casting bed in response to a reaction force resulting from the feeding of concrete mass by the auger feeders, which advancement of the slipform-casting machine can be accelerated or decelerated as necessary by means of a drive motor of the slipform-casting apparatus. As the slipform-casting machine advances, the cast product remains on the casting bed for hardening and curing prior to its possible cutting for defined-length blocks and replacement to storage.

Auger feeders can also be used in slipform-casting machine types other than extruder types, where the auger feeders can enhance the feeding of concrete mix, for example at a specific feeding stage.

At present, auger feeders are usually attached by way of flanges fixed to a shaft rotating the auger feeder and to the auger feeders. These flanges are fastened to each other by screws extending through unthreaded holes existing in the flanges. An established approach with these attachments is to weld the screw heads securely to the flange in an effort to ensure the durability of the auger feeder attachment in use.

SUMMARY

A problem with this type of ordinary attachment is the penetration of concrete mix during a casting process into holes at the end of the screws in the attachment flanges and threads and hardening therein, which considerably hinders the detachment and replacement of auger feeders.

In a solution according to embodiments described herein, during the auger feeder manufacturing process, upon its end is fitted an insert which is used for the attachment of the auger feeder. The insert is formed with threaded blind holes, which are used to fasten the auger feeder to the flange of a shaft rotating the auger feeder. Thus, the concrete mix is not able to penetrate into the ends of fastening screws and to thereby hinder detachment of the auger feeder.

In the solution according to embodiments described herein, the entity formed by an insert and an auger feeder is preferably dimensioned in such a way that the insert will only have a slight or no contact with concrete mix during operation of the auger feeder, i.e. it ends up on the vacant side of a mass plate of the slipform-casting machine.

More specifically, disclosed herein is an embodiment of an auger feeder according to described embodiments is characterized in that the auger feeder comprises an insert (2) mounted on an upstream end of the auger feeder, said insert being manufactured in a material softer than that used for manufacturing the auger feeder's helical segment (1), and said insert comprising means (4) for fastening the auger feeder to a casting apparatus.

Also disclosed herein is an embodiment of an auger feeder manufacturing method comprising the manufacture of a helical segment (1) of the auger feeder, characterized in that an insert (2) to be mounted on an upstream end of the auger feeder is manufactured from a material softer than that used for the auger feeder's helical segment (1), and the insert is provided with means (4) for fastening the auger feeder to a casting apparatus.

Also disclosed herein is an embodiment of a slipform-casting apparatus having an auger feeder as described herein.

BRIEF DESCRIPTION OF DRAWINGS

Embodiments of the invention will now be described more precisely by way of example with reference to the accompanying figures, in which.

DETAILED DESCRIPTION OF SPECIFIC EMBODIMENTS

The embodiment of the invention depicted in the figures comprises an actual auger feeder 1, an insert 2, and an infill cast 3 covering at least a part of the insert.

Figure 1:
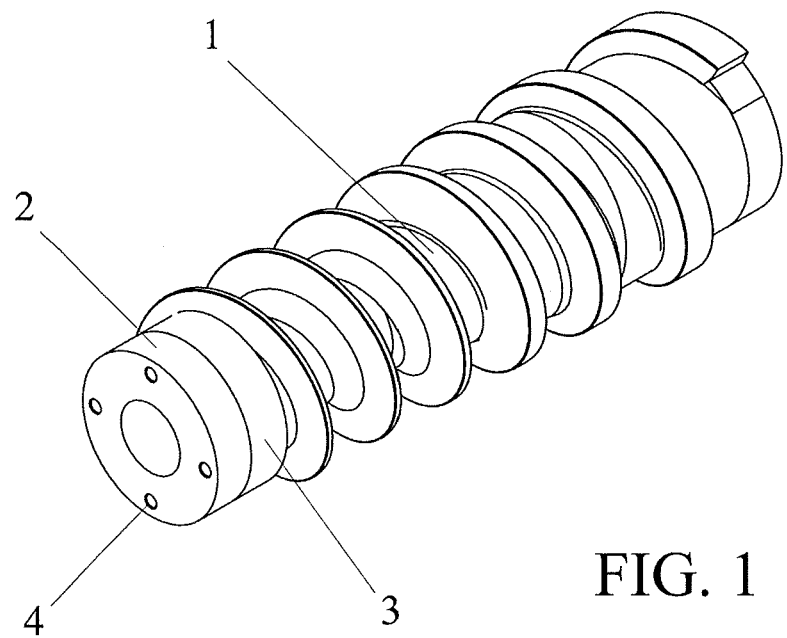
FIG. 1 is perspective schematic view that shows one auger feeder according to an embodiment of the invention.
Figure 2:
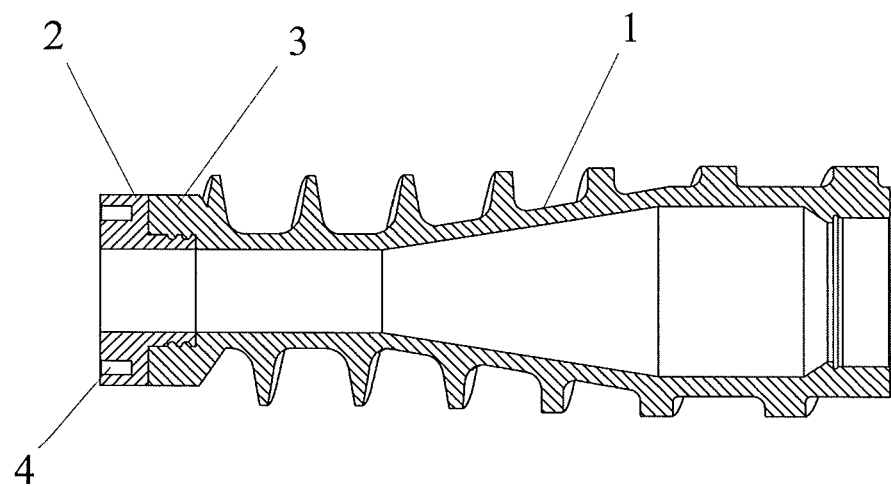
FIG. 2 is a diagram that shows the auger feeder of FIG. 1 in a cross-section.

The insert 2 is attached to the upstream end of the actual auger feeder 1, i.e. of a helical segment of the auger feeder, by which upstream end the auger feeder attachment to a casting machine takes place. For this auger feeder attachment, the insert 2 is formed with threaded fastening holes 4. The auger feeder is fastened with screws to a flange fixed to an auger-driving shaft, the heads of said screws remaining on the side of the attachment flange. As seen in FIG. 2, these fastening holes 4 existing in the insert 2 have preferably solid bottoms, thus blocking the access of concrete mass to be cast to the joint or components relevant thereto.

In the illustrated solution, within the area of a joint between the insert 2 and the auger feeder 1, at least partially on top of the insert 2, is preferably added a cast infill 3, said cast infill securing the insert mechanically in place, as well as advantageously protecting the insert, along with other components of the casting apparatus, from the abrading action of concrete mix. This cast infill 3 is preferably produced at the same time as the auger feeder 1 is cast and from the same material as the auger feeder.

In the solution according to the invention, the insert 2 is preferably made in a material which is softer than the manufacturing material of the wear resistant auger feeder 1. The softer material of the insert 2 enables machining of the threads of fastening screws to the component, as well as working an attachment surface to the insert required for machining the entity formed by the auger feeder and the insert. In addition, the softer material of the insert 2 enables working and finishing of the surfaces needed in the alignment and attachment of the auger feeder. In the past, the alignment of an auger feeder in the process of mounting it on a casting apparatus was carried out by using a separate alignment ring. Examples of suitable insert materials include e.g. S355 grade structural steel and spheroidal graphite cast iron.

The insert 2 has a material hardness which is preferably less than 40 HRC, more preferably less than 36 HRC, and most preferably less than 30 HRC for sufficient workability. It should be noted, however, that the insert 2 used in the solution of the invention can also be tempered as necessary after the working process for raising its hardness to as high as 62 HCR. Accordingly, in the solution according to the invention, the material hardness or softness of the insert 2 with respect to a harder material of the actual auger feeder 1 is regarded in reference to the hardness of an insert during the working process of the material.

The cast infill 3 is preferably composed of hard, wear-resistant cast iron and of the same material as the auger feeder 1 itself. Examples of this hard, wear-resistant material include grades of white cast iron, such as chrome iron and Ni-Hard. In addition, the cast infill is preferably produced in the same casting as the auger feeder.

The auger feeder 1 has a material hardness which is preferably not less than 50 HRC, more preferably not less than 55 HRC, and most preferably not less than 58 HRC.

In the solution according to the invention, the insert 2 can preferably be provided with runners, which enable preventing the cast infill 3 to be cast at least partially thereupon from possible cracking as the cast infill is cooling in the wake of a casting process.

The insert 2 can be further provided with recesses or holes, into which the cast material is able to penetrate during casting of the cast infill 3. This provides a more fortified joint between the insert 2 and the cast infill 3, the joint being thereby better equipped to bear forces and torques applied thereto in use.

Figure 3:
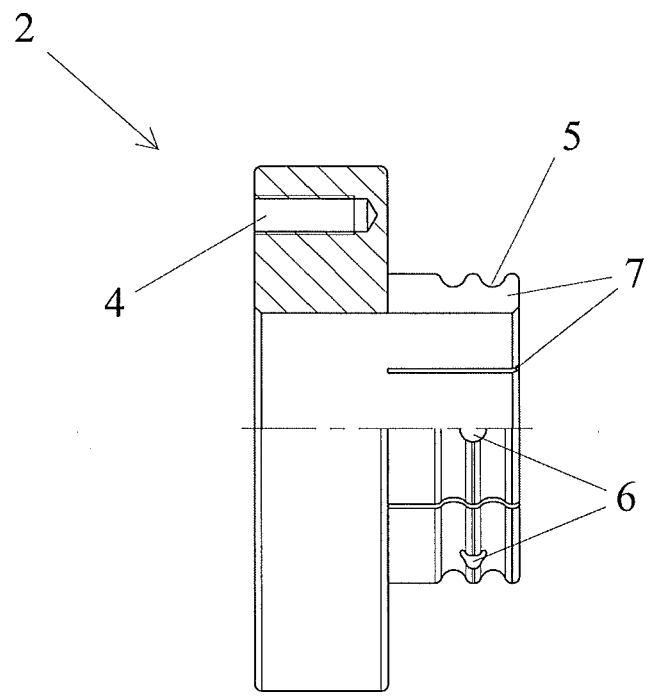
FIG. 3 shows one insert according to the invention in a partial cross-section.

FIG. 3 shows an insert 2 of the invention in a partial cross-section. During its manufacturing process, the insert 2 is machined for threaded fastening holes 4, whereby an insert-equipped auger feeder is attached to a casting apparatus. The insert 2 is further machined for grooves 5 and recesses 6, which end up underneath the auger feeder casting and which enable ensuring a mechanical attachment of the insert to the auger feeder casting in a form-closed fashion.

According to FIG. 3, the insert 2 is preferably also formed with runners 7, which provide resilience for the insert portion ending up under the auger feeder casting, thereby making it possible to prevent the harder, wear-resistant auger feeder material to be cast thereupon from developing cracks as the cast material is cooling. The runners 7 have a width which is preferably less than 2 mm and more preferably less than 1.7 mm, thus enabling to make sure that the cast molten material is not able to penetrate into these runners and thereby to impede the designed function thereof. As seen in FIG. 3, the runners 7 are grooves linking an inner surface and an outer surface of the insert 2 to each other and extending over the length of an insert portion left underneath the auger feeder casting.

Figure 4:
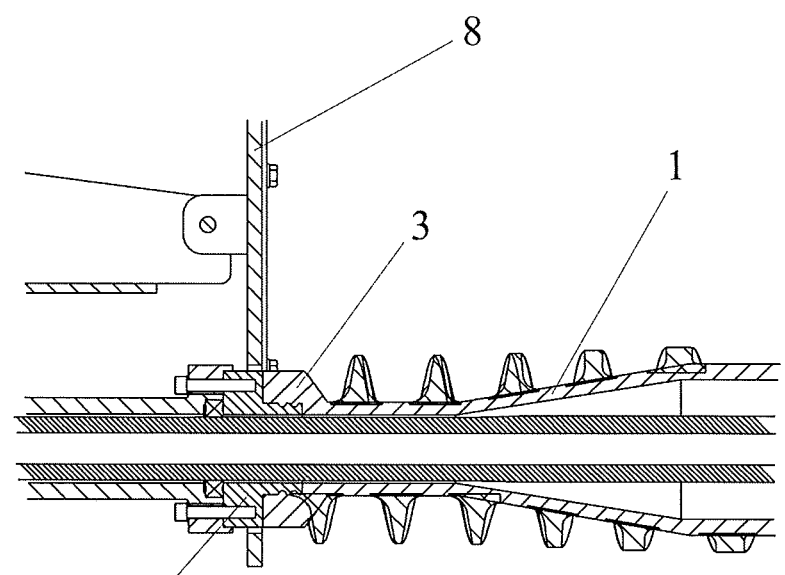
FIG. 4 shows one auger feeder according to the invention in a cross-section in an assembled condition.

FIG. 4 depicts an auger feeder 1 of the invention set in its position in an extruder type casting apparatus. It can be seen in the figure that the insert 2 preferably ends up behind and partially under a mass plate 8 delimiting a concrete mix feeding space and how the infill cast 3 substantially covers the insert 2 elsewhere. As a result, the insert 2 of a softer material is essentially not allowed to become exposed to the abrading action of concrete mix.

The embodiment of FIG. 4 also shows an advantageous solution for the alignment of an auger feeder of the invention relative to a shaft rotating the same. In this respect, the insert 2 is embedded within protrusions formed on a shaft fastening flange. This solution necessitates the machining of an attachment surface of the insert 2 as well as an outer surface connecting laterally with the attachment surface, which machining is made possible by a softer insert material.

The invention claimed is:

1. An auger feeder for concrete mix, comprising:
   a portion comprising a helical segment, and having an upstream end and a downstream end;
   an insert, comprising:
      a first end mounted on the upstream end of the portion comprising the helical segment,
      a second end, comprising a face disposed in the upstream direction of the auger feeder, and comprising means for fastening the auger feeder to a casting apparatus, and
      a material softer than that of the helical segment, and
   an cast infill disposed at, and extending in the upstream direction from, the upstream end of the helical segment and covering at least part of the insert at the first end thereof.

2. An auger feeder according to claim 1, wherein the cast infill consists of the same material as the auger feeder's helical segment.

3. An auger feeder according to claim 1, wherein said insert is provided with runners at least in parts covered by said cast infill.

4. An auger feeder according to claim 1, wherein said insert is formed with grooves and recesses, and said cast infill penetrates therein during a casting process of the cast infill.

5. An auger feeder according to claim 1, wherein said cast infill has a diameter which substantially matches the diameter of an opening formed in a mass plate of a slipform-casting apparatus for operating the auger feeder.

6. An auger feeder according to claim 1, wherein said insert is formed from a material having hardness less than 40 HRC determined in its machining stage.

7. A slipform-casting apparatus for concrete mass comprising an auger feeder according to claim 1.

8. An auger feeder according to claim 2, wherein said insert is provided with runners at least in parts covered by said cast infill.

9. An auger feeder according to claim 2, wherein said insert is formed with grooves and recesses, and said cast infill penetrates therein during a casting process of the cast infill.

10. An auger feeder according to claim 3, wherein said insert is formed with grooves and recesses, and said cast infill penetrates therein during a casting process of the cast infill.

11. An auger feeder according to claim 8, wherein said insert is formed with grooves and recesses, and said cast infill penetrates therein during a casting process of the cast infill.

12. An auger feeder according to claim 2, wherein said cast infill has a diameter which substantially matches the diameter of an opening formed in a mass plate of a slipform-casting apparatus for operating the auger feeder.

13. An auger feeder according to claim 3, wherein said cast infill has a diameter which substantially matches the diameter of an opening formed in a mass plate of a slipform-casting apparatus for operating the auger feeder.

14. An auger feeder according to claim 4, wherein said cast infill has a diameter which substantially matches the diameter of an opening formed in a mass plate of a slipform-casting apparatus for operating the auger feeder.

15. An auger feeder according to claim 6, wherein said insert is formed from a material having a hardness less than 36 HRC determined in its machining stage.

16. An auger feeder according to claim 15, wherein said insert is formed from a material having a hardness less than 30 HRC determined in its machining stage.

17. A slipform-casting apparatus for concrete mass equipped with an auger feeder according to claim 1.

18. An auger feeder according to claim 1, wherein the means for fastening the auger feeder to the casting apparatus comprises threaded fastening holes in the face of the second end of the insert.

* * * * *